us008916669B2

United States Patent
Zhang et al.

(10) Patent No.: US 8,916,669 B2
(45) Date of Patent: Dec. 23, 2014

(54) METHODS FOR PRODUCING CROSSLINKABLE SILYL GROUP-CONTAINING POLYOXYALKYLENE POLYMERS

(75) Inventors: Ling Zhang, Missouri City, TX (US); Daniel A. Aguilar, Lake Jackson, TX (US); Debkumar Bhattacharjee, Blue Bell, PA (US); William A. Koonce, Pearland, TX (US); Basudeb Saha, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 18 days.

(21) Appl. No.: 13/696,918

(22) PCT Filed: May 26, 2011

(86) PCT No.: PCT/US2011/038065
§ 371 (c)(1),
(2), (4) Date: Nov. 8, 2012

(87) PCT Pub. No.: WO2011/150161
PCT Pub. Date: Dec. 1, 2011

(65) Prior Publication Data
US 2013/0060000 A1    Mar. 7, 2013

Related U.S. Application Data

(60) Provisional application No. 61/348,996, filed on May 27, 2010.

(51) Int. Cl.
| | |
|---|---|
| C08G 65/336 | (2006.01) |
| C08G 65/12 | (2006.01) |
| C08G 18/28 | (2006.01) |
| C08G 18/76 | (2006.01) |
| C08G 65/26 | (2006.01) |

(52) U.S. Cl.
CPC ............ *C08G 65/336* (2013.01); *C08G 18/289* (2013.01); *C08G 18/7664* (2013.01); *C08G 65/2663* (2013.01)
USPC ................. 528/31; 528/28; 528/35; 528/403; 528/412; 528/414; 528/421

(58) Field of Classification Search
None
See application file for complete search history.

(56) References Cited

U.S. PATENT DOCUMENTS

| | | | | |
|---|---|---|---|---|
| 3,278,459 | A | * | 10/1966 | Herold .......................... 528/412 |
| 3,971,751 | A | | 7/1976 | Isayama et al. |
| 4,374,237 | A | | 2/1983 | Berger et al. |
| 4,474,933 | A | | 10/1984 | Huber et al. |
| 5,130,413 | A | | 7/1992 | Asai et al. |
| 5,227,434 | A | | 7/1993 | Katz |
| 5,536,883 | A | * | 7/1996 | Le-Khac ....................... 568/620 |
| 5,986,122 | A | | 11/1999 | Lewis et al. |
| 6,053,995 | A | | 4/2000 | Tanibuchi et al. |
| 6,077,902 | A | | 6/2000 | Roesler et al. |
| 6,503,995 | B2 | | 1/2003 | Tsuji et al. |
| 7,417,105 | B2 | | 8/2008 | Landon et al. |
| 7,435,787 | B2 | | 10/2008 | Banevicius et al. |
| 7,524,915 | B2 | | 4/2009 | Huang et al. |
| 2008/0125562 | A1 | | 5/2008 | Jono |
| 2008/0125563 | A1 | | 5/2008 | Jono |

FOREIGN PATENT DOCUMENTS

| | | |
|---|---|---|
| EP | 0397036 | 11/1990 |
| EP | 1146062 A1 | 10/2001 |
| EP | 1264854 A1 | 12/2002 |
| EP | 1445283 A1 | 8/2004 |
| EP | 2055741 A1 | 5/2009 |
| JP | 5-125176   * | 5/1993 |
| WO | 2006/004988 A2 | 1/2006 |

OTHER PUBLICATIONS

Translation of JP 5-125176 into the English language (no date).*
69336-WO-PCT_20120403_DCU_Search_Report_and_Written_Opinion.

* cited by examiner

*Primary Examiner* — Marc Zimmer

(57) ABSTRACT

Embodiments of the invention provide for a method of producing a silylated polyoxyalkylene polymer having at least one crosslinkable silyl group and at least one hydroxyl group in each molecule. The method comprises providing a polyoxyalkylene polymer having at least one unsaturated group and at least one alcoholic hydroxyl group in each molecule, wherein the polyoxyalkylene polymer includes an impurity double metal cyanide complex mixed therein, and wherein the polyoxyalkylene polymer has not been treated with a metal-coordinating compound; and adding to the polyoxyalkylene polymer a compound having a hydrogen-silicon bond and a crosslinkable silyl group in each molecule and a hydrosilylation catalyst to thereby carry out a hydrosilylation reaction, wherein the hydrosilyation reaction is performed in an absence of a metal-coordinating compound.

20 Claims, No Drawings

METHODS FOR PRODUCING CROSSLINKABLE SILYL GROUP-CONTAINING POLYOXYALKYLENE POLYMERS

CROSS-REFERENCE TO RELATED APPLICATIONS

This application claims the benefit of U.S. Provisional Patent Application No. 61/348,996, filed on May 27, 2010, and fully incorporated herein by reference.

FIELD OF THE INVENTION

Embodiments of the invention relate to methods of producing crosslinkable silyl group-containing polyoxyalkylene polymers.

BACKGROUND OF THE INVENTION

Crosslinkable silyl group-containing polyoxyalkylene polymers are widely used as raw material polymers in sealing materials, adhesives, coating materials and the like for architectural or industrial use. Such crosslinkable silyl group-containing polyoxyalkylene polymers may be produced according to various methods, such as the methods mentioned in U.S. Pat. No. 6,503,995. For example, first a polyoxyalkylene polymer having at least one unsaturated group and at least one alcoholic hydroxyl group in each molecule may be obtained by subjecting an epoxy compound to ring opening polymerization using an unsaturated group- and active hydrogen-containing compound as a polymerization initiator and a double metal cyanide complex as a catalyst. The polyoxyalkylene polymer may then be reacted with a compound having a hydrogen-silicon bond and a crosslinkable silyl group in each molecule in the presence of a hydrosilylation catalyst to thereby carry out a hydrosilylation reaction. However, according to U.S. Pat. No. 6,503,995, in order for the hydrosilylation yield to be acceptable, the polyoxyalkylene polymer must first either have the double metal cyanide complex catalyst removed or be treated with a metal-coordinating compound before the hydrosilylation reaction.

Therefore there is a need for method for producing crosslinkable silyl group-containing polyoxyalkylene polymers without the need to remove or otherwise treat the double metal cyanide catalyst.

SUMMARY OF THE INVENTION

Embodiments of the invention provide for methods of producing highly hydrosilylated polyoxyalkylene polymers without the need to remove or otherwise treat double metal cyanide (DMC) catalysts complex present in the hydrosilylation reactants.

In one embodiment a method of producing a hydrosilylated polyoxyalkylene polymer having at least one crosslinkable silyl group and at least one hydroxyl group in each molecule is provided, The method includes providing a polyoxyalkylene polymer having at least one unsaturated group and at least one alcoholic hydroxyl group in each molecule. The polyoxyalkylene polymer includes an impurity double metal cyanide complex mixed therein, and the polyoxyalkylene polymer has not been treated with a metal-coordinating compound and has not been purified to significantly remove the impurity double metal cyanide complex. The method further provides adding to the polyoxyalkylene polymer a compound having a hydrogen-silicon bond and a crosslinkable silyl group in each molecule and a hydrosilylation catalyst to thereby carry out a hydrosilylation reaction. The hydrosilyation reaction is performed in an absence of a metal-coordinating compound and the hydrosilyation reaction has a hydrosilylation efficiency of at least about 70% as determined by $^1$H-NMR.

In another embodiment a method of producing a crosslinkable silyl group-containing polyoxyalkylene polymer is provided, The method includes (a) providing a polyoxyalkylene polymer having at least one unsaturated group and at least one alcoholic hydroxyl group in each molecule, wherein the polyoxyalkylene polymer includes an impurity double metal cyanide complex mixed therein, and wherein the polyoxyalkylene polymer has not been treated with a metal-coordinating compound and has not been purified to significantly remove the impurity double metal cyanide complex, then adding to the polyoxyalkylene polymer a compound having a hydrogen-silicon bond and a crosslinkable silyl group in each molecule and a hydrosilylation catalyst to thereby carry out a hydrosilylation reaction, wherein the hydrosilyation reaction is performed in an absence of a metal-coordinating compound and the hydrosilyation reaction has a hydrosilylation efficiency of at least about 70% as determined by $^1$H-NMR; and (b) carrying out a coupling reaction in which the hydroxyl group occurring in the polymer is involved.

DESCRIPTION OF EMBODIMENTS OF THE INVENTION

Embodiments of the invention provide for methods of producing highly hydrosilylated polyoxyalkylene polymers without the need to remove or otherwise treat double metal cyanide (DMC) catalysts complex present in the hydrosilylation reactants.

The hydrosilylation reactants include at least one polyoxyalkylene polymer (having at least one unsaturated group and at least one alcoholic hydroxyl group in each molecule and at least one compound having a hydrogen-silicon bond and a crosslinkable silyl group in each molecule.

The at least one polyoxyalkylene polymer having at least one unsaturated group and at least one alcoholic hydroxyl group in each molecule (hereinafter referred to as "polyoxyalkylene polymer") may be made by subjecting an epoxy compound to ring opening polymerization using an unsaturated group- and active hydrogen-containing compound as a polymerization initiator and a double metal cyanide catalyst complex as a catalyst.

The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The alcoholic hydroxyl-containing compound may include allyl alcohol, methallyl alcohol, trimethylolpropane monoallyl ether, trimethylolpropane diallyl ether, glycerol monoallyl ether, glycerol diallyl ether; ethylene oxide adducts or propylene oxide adducts thereof and like compounds containing at least one unsaturated group and at least one alcoholic hydroxyl group in each molecule; hydroxyl-terminated hydrocarbon compounds such as hydroxyl-terminated polybutadiene; and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

According to the embodiments of the invention, the DMC catalyst complex may comprise a metal selected from potassium, zinc, cobalt, iron, chromium, platinum, and/or iridium. For example, a DMC catalyst complex may include zinc hexacyanocobaltate $Zn_2[Co(CN)_6]_2$ prepared, in part, from potassium hexacyanocobaltate $K_3[Co(CN)_6]$. Some methods of catalyst preparation have been reported: Such DMC catalysts and methods of preparation are well known in the art, see for example, U.S. Pat. Nos. 3,427,334; 3,941,849; 4,477,589; 5,158,922; 5,470,813 and 5,482,908.

In the embodiments of the invention, the DMC catalyst complex includes an organic complexing agent. Suitable complexing agents may include water-soluble aliphatic alcohols, such as ethanol, isopropanol, n-butanol, isobutanol, 2-butanol, tert-butanol, and trimethylolpropane. In another embodiment, the catalyst may also include a polyol complexing agent, see for example U.S. Pat. Nos. 5,482,908, 5,545,601; 5,637,673 and 5,789,626. In one embodiment the complexing agent is tert-butanol. In yet another embodiment the complexing agent may be a combination of water-soluble aliphatic alcohols, such as for example tert-butanol, and polyols, such as for example polypropylene glycol.

The DMC catalyst complex, in some embodiments, may be activated. For example, the catalyst may be activated prior to introduction to a reactor (e.g., before arriving at a catalyst inlet). The catalyst may be activated, for example, upon introduction to a reactor (e.g., in a catalyst inlet). The catalyst may be activated, for example, after introduction to a reactor (e.g., in a reaction chamber within a reactor).

The DMC catalyst complex, in some embodiments, may be present in at a concentration of from about 10 ppm to about 1000 ppm, from about 10 ppm to about 100 ppm, from about 10 ppm to about 50 ppm, or from about 20 ppm to about 30 ppm based on the weight the resulting polyoxyalkylene polymer.

The ring opening polymerization reaction may be performed as is commonly known in the art. The ring opening polymerization reaction may be performed continuously or batchwise.

In a continuous processes, the polymerization initiator and catalyst mixture is continuously fed into a continuous reactor such as a continuously stirred tank reactor (CSTR) or a tubular reactor. A feed of monoepoxide is introduced into the reactor and the product continuously removed. Examples of such continuous processes are described in, for example, EP912625.

In a batch processes, the polymerization may be performed by first mixing the polymerization initiator and the DMC catalyst complex. The dispersion of solid catalyst may be homogenized with a commercially available homogenizer, such as an IKA Ultra Turrax T25 high speed mixer. In one embodiment the dispersion is homogenized at about 20000 rpm for about 1 minute. The catalyst may alternatively be dispersed in a solvent and then mixed with the polymerization initiator. The solvent may be a non-protic polar solvent such as acetone, DMSO or THF. Alternatively the solvent may be a non-protic non-polar solvent such as benzene, toluene or xylene. While stiffing, the mixture may be flushed several times with an inert gas, such as nitrogen or argon. The inert gas may be introduced such that the internal pressure of the reaction vessel is between about 1 bar and about 10 bar, or between about 2 bar and about 5 bar. Stirring may be performed at between about 10 rpm and about 1000 rpm, preferably between about 100 rpm and about 700 rpm. In one embodiment the stirring is performed at about 500 rpm. Alternatively, while continuing to stir the mixture, a vacuum may be applied to reduce the pressure in the reaction vessel to about 0.01-0.5 bar.

The mixture of catalyst and the polymerization initiator are then heated to between about 90° C. and about 160° C., or between about 120° C. and about 140° C., and then adding to the reactor with an initial quantity of monoepoxide, until a pressure is reached in the reaction vessel of between about 1 bar and about 10 bar, preferably between about 2 bar and about 5 bar. In one embodiment, the mixture is heated to about 120° C., and the reaction vessel pressurized with alkylene oxide to about 3 bars. The monoepoxide may be metered into the reaction vessel. For example, the monoepoxide may be added to the reaction vessel over a time of between about 0.5 hours and about 30 hours, or between about 10 hours and about 20 hours. Upon all the monoepoxide being added the reaction vessel contents may continue to be stirred at the reaction temperature to complete the reaction of the monoepoxide over a time of between about 0.5 hours and about 5 hours. Subsequent amounts of monoepoxide may be metered into the reaction vessel, or to fractions of the reaction vessel contents, to further polymerize and increase the molecular weight of the reaction product. The further monoepoxide reactions may be performed at similar reaction conditions as in when the initial quantity of monoepoxide is reacted, or at different reaction conditions, such as different reaction temperature and/or reaction stirring rate.

The molecular weight of the resulting unsaturated polyoxyalkylene polymer may, in terms of number average molecular weight, be between about 1,000 and about 30,000, or between about 5000 and 12,000. The number average molecular weight can be determined by measuring the terminal groups. Specifically, when the polyoxyalkylene polymer is linear type polymer, the molecular weight can be determined by obtaining a hydroxyl value (OHV; meq/g) per a unit weight and an unsaturated value (IV; meq/g) from a known method, followed by calculating it with the formula: 2000/(IV+OHV). Alternatively, the number average molecular weight can be determined by gel permeation chromatograpy using PEG standards.

The resulting polyoxyalkylene polymers may have low concentrations of free zinc ions. The concentration of free zinc ions in the polyoxyalkylene polymers may, for example, be below 0.2, 0.15, 0.10, 0.075, 0.05, 0.025, 0.01, 0.0075, 0.005, 0.0025, or 0.001 parts per hundred of polyoxyalkylene polymers.

Surprisingly, and contrary to the teachings of U.S. Pat. No. 6,503,995, the unsaturated polyoxyalkylene polymers according to the embodiments of the invention may undergo a hydrosilylation reaction without the need to remove or otherwise treat (such as adding a metal-coordinating compound to the polyoxyalkylene polymer) the DMC catalysts complex present in the unsaturated polyoxyalkylene polymers. Even without the removal or treatment of the DMC catalysts complex, the unsaturated polyoxyalkylene polymers according to the embodiments or the invention may be hydrosilylated with a high hydrosilylation efficiency. In some embodiments, the unsaturated polyoxyalkylene polymers are hydrosilylated with a hydrosilylation efficiency of at least about 70%, such as between about 70% and 95%. This includes unsaturated polyalkylene oxide polymers hydrosilylated with a hydrosilylation efficiency of 80 to 95% and further includes hydrosilylated polymers capped with a hydrosilylation efficiency of 85 to 92%. As used herein, the "hydrosilylation efficiency"=[100×((number of unsaturation groups on the polyol hydrosilylated)/(total number of unsaturation groups on the polyol that were initially available for hydrosilylation)], and may be measured using $^1$H-NMR.

The unsaturated polyoxyalkylene polymers may be hydrosilylated by reacting the polyoxyalkylene polymers with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

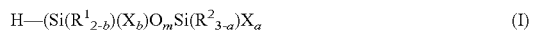

$$H\!-\!(Si(R^1{}_{2-b})(X_b)O_m Si(R^2{}_{3-a})X_a \quad (I)$$

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3{}_3SiO$— and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of $-SiR^1{}_{2-b}(X_b)O-$ groups may be the same or different with each other or one another; and m represents an integer from 0 to 19 provided that the relation $a+\Sigma b \geq 1$ should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (I) may include the compounds represented by the general formula (II):

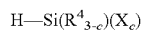

$$H\!-\!Si(R^4{}_{3-c})(X_c)$$

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3{}_3SiO$— and, when there are a plurality of $R^4$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis (methyl ethyl ketoximato)methylsilane and tris(acetoximato) silane; alkenyloxysilanes such as methylisopropenyloxysilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, RhCl $(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred, $H_2PtCl_6 \cdot 6H_2O$, platinum-vinylsiloxane complexes and platinum-mean complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3, 3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 part by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or between the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

The hydrosilylated polyoxyalkylene polymer having at least one crosslinkable silyl group and at least one hydroxyl group in each molecule (hereinafter referred to as "hydrosilylated polyoxyalkylene polymer") as produced by the above described process can react with water or atmospheric moisture to give crosslinked cured products and therefore is useful as a raw material or raw material intermediate for sealing, adhesive, coating and like materials or compositions for architectural or industrial use. The high remaining hydroxyl group percentage of this polyoxyalkylene polymer having at least one crosslinkable silyl group and at least one hydroxyl group in each molecule is favorable for the functional group introduction thereinto by urethane bond formation or esterification, for instance, or for the coupling thereof.

In subjecting the hydrosilylated polyoxyalkylene polymer to coupling reactions utilizing the hydroxyl group thereof in accordance with the embodiments of the invention, a coupling agent is used. The coupling agent to be utilized is not particularly restricted provided that it has two or more functional groups capable of reacting with the hydroxyl group but includes, among others, polyisocyanate compounds, polybasic carboxylic acid compounds, polybasic carboxylic acid anhydrides and polybasic carboxylic acid derivatives. Further, compounds having only one functional group but capable of reacting with and binding to two or more hydroxyl groups can also be used. Such compounds include, but are not limited to, aldehyde compounds and carbonate compounds, for instance.

For the cured products to acquire satisfactory physical characteristics, it is preferred that the yield of the coupling reaction which utilizes the hydroxyl group is as high as possible. In accordance with the present invention, a yield of not less than 80% is preferably for the coupling reaction, more preferably not less than 85%, based on the area ratio of the values as obtained from the gel permeation chromatography analysis. Here, the following formula is used in the calculation method of obtaining the yield of the coupling reaction from the gel permeation chromatography analysis: $(1-X) \times 100(\%)$, where X is the ratio of the peak area showing the uncoupled polymer relative to the peak area showing total polymer.

Among the coupling agents usable in the practice of the embodiments of the invention, the polyisocyanate compounds, namely compounds having two or more isocyanato groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, saturated analogues of the above mentioned aromatic isocyanates, and mixtures thereof.

Among the coupling agents usable in the practice of the embodiments of the invention, the polybasic carboxylic acid compounds include, but are not limited to, adipic acid, itaconic acid, iminodiacetic acid, ethylenediaminetetraacetic acid, glutaric acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, 1,2-cyclohexanediaminetetraacetic acid, brasilic acid, malonic acid, isophthalic acid, terephthalic acid, naphthalenedicarboxylic acid, 5-hydroxyisophthalic acid, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, imidazole-4,5-dicarboxylic acid, chelidamic acid, 2,3-pyrazinedicarboxylic acid, folic acid, citric acid, succinic acid, fumaric acid, malic acid, glutamic acid, aspartic acid and cystine, among others.

Among the coupling agents usable in the practice of the embodiments of the invention, the polybasic carboxylic acid anhydrides include, but are not limited to, itaconic anhydride, citraconic anhydride, maleic anhydride, 3,3',4,4'-benzophenonetetracarboxylic acid dianhydride, trimellitic anhydride, pyromellitic anhydride, phthalic anhydride, maleated methylcyclohexene tetrabasic acid anhydride, endomethylenetetrahydrophthalic anhydride, chlorendic anhydride, methylendomethylenetetrahydrophthalic anhydride and methyltetrahydrophthalic anhydride, among others.

Among the coupling agents usable in the practice of the embodiments of the invention, the polybasic carboxylic acid derivatives include, but are not limited to, diethyl ethoxymethylenemalonate, diethyl succinate, diethyl oxalate, fumaroyl chloride, diallyl hexahydrophthalate, diethyl malonate, diallyl isophthalate, dimethyl isophthalate, dimethyl terephthalate, diallyl terephthalate, triallyl trimellitate, dimethyl naphthalenedicarboxylate, bis(2-hydroxyethyl)terephthalate, o-phthaloyl chloride, diallyl phthalate, butylphthalyl butyl glycolate, dimethyl phthalate, diethyl phthalate, dibutyl phthalate, diheptyl phthalate, di-2-ethylhexyl phthalate, butyl benzyl phthalate, dicyclohexyl phthalate, dioctyl adipate, diisononyl adipate, bis(2-ethylhexyl)azelate, dibutyl sebacate, triethyl acetylcitrate, dibutyl maleate, dibutyl fumarate, dilauryl 3,3'-thiodipropionate, ethylene dodecanedioate, ethylene brasilate, aspartame, succinyl dichloride, oxalyl dichloride, o-phthaloyl dichloride and adipoyl dichloride, among others.

Among the coupling agents usable in the practice of the embodiments of the invention, the aldehyde compounds include, but are not limited to, acrolein, acetaldehyde, octylaldehyde, glyoxal, glyoxylic acid, crotonaldehyde, butyraldehyde, formaldehyde, methacrolein, methylglyoxal, p-aminobenzaldehyde, 3,4,5-trimethoxybenzaldehyde, hydroxybenzaldehyde, benzaldehyde, 3-aldehydopyridine, furfural, chlorobenzaldehyde, dichlorobenzaldehyde, monochloroacetaldehyde, trifluoromethylbenzaldehyde, anisaldehyde, amylcinnamic aldehyde, undecylenic aldehyde, cuminaldehyde, cinnamaldehyde, cyclamen aldehyde, 3,4-dimethoxybenzaldehyde, decylaldehyde, vanillin, hydroxycitronellal, phenylacetaldehyde, heliotropin and p-methylphenylacetaldehyde, among others.

Among the coupling agents usable in the practice of the embodiments of the invention, the carbonate compounds include, but are not limited to, ethylene carbonate, diethyleneglycolbis(allyl carbonate), di-tert-butyl carbonate, dimethyl carbonate, propylene carbonate, diethyl carbonate, diallyl carbonate, allyl ethyl carbonate and diphenyl carbonate, among others.

In the practice of the embodiments of the invention, the coupling agent is used preferably in an amount of 0.5 to 3 moles, more preferably 0.8 to 2 moles, most preferably 0.95 to 1.5 moles, as expressed in terms of such a functional group as an isocyanate or carboxyl group, per mole of the hydroxyl group in the polyoxyalkylene polymer containing at least one crosslinkable silyl group and at least one hydroxyl group.

Those coupling agents which can be used in the practice of the embodiments of the invention may be used singly or a plurality thereof may be used in combination.

When a compound having two or more isocyanato groups in each molecule is used as the coupling agent, up to about 5 moles of the isocyanato group can be reacted with the hydroxyl groups in each mole of the hydrosilylated polyoxyalkylene polymer. In such a case, it is possible to effect the coupling by reacting a compound having two or more active hydrogen atoms in each molecule with the excess isocyanato group. Thus, the polyoxyalkylene polymer having at least one crosslinkable silyl group and at least one hydroxyl group in each molecule is reacted with a compound having two or more isocyanato groups in each molecule in relative amounts such that the isocyanato group is excess relative to the hydroxyl group and then the unreacted isocyanato group is reacted with a compound having two or more active hydrogen atoms in each molecule, whereby the coupling reaction can be effected.

Such compound having two or more active hydrogen atoms in each molecule includes, but is not limited to, compounds having, in each molecule, two or more groups selected from the group consisting of hydroxyl, mercapto, carboxyl and nitrogen-bound hydrogen-containing amino groups.

Such compounds include, but are not limited to, polyhydric alcohols such as 3,6-dimethyl-4-octyne-3,6-diol, 2,4,7,9-tetramethyl-5-decyne-4,7-diol, 2,5-dimethyl-3-hexyne-2,5-diol, 2,5-dimethyl-3-hexane-2,5-diol, N-methyldiethanolamine, triisopropanolamine, triethanolamine, ethylene glycol, diethylene glycol, triethylene glycol, octanediol, sorbitol polyglycidyl ether, gluconic acid, glycerol .alpha.-monochlorohydrin, 1,4-cyclohexanediol, 1,3-dihydroxyacetone, disodium 1,4-dihydroxy-1,4-butanedisulfonate, diisopropyl tartrate, thiodiglycol, trimethylolethane, trimethylolpropane, neopentyl glycol, butanediol, 2-butyl-2-ethyl-1,3-propanediol, propylene glycol, dipropylene glycol, tripropylene glycol, 1,6-hexanediol, 1,2,6-hexanetriol, hexylene glycol, pentaerythritol, 1,5-pentanediol, polyethylene glycol, polytetramethylene ether glycol, polypropylene glycol, 3-methyl-1,5-pentanediol, catechol, 1,4-dihydroxyanthraquinone, 1,4-dihydroxynaphthalene, hydrogenated bisphenol A, 2,3,4-trihydroxybenzophenone, 2,3,5-trimethylhydroquinone, hydroquinone, bis(2-hydroxyethyl) terephthalate, bis(4-hydroxyphenyl)sulfone, bisphenol A, p-hydroxyphenethyl alcohol, 4-tert-butylcatechol, 2-tert-butylhydroquinone, protocatechuic acid, phloroglucinol, gallic acid, lauryl gallate, resorcinol, leuco-1,4-dihydroxyanthraquinone, 1,1'-bi-2-naphthol, 2-phenyl-4,5-bis(hydroxymethyl)imidazole, kojic acid, citrazinic acid, spiroglycol, tris(2-hydroxyethyl)isocyanurate, 5-fluorouracil, 2-(2-hydroxyethoxy)ethyl 2-hydroxypropyl tetrabromophthalate, 2,2-bis(4-hydroxyphenyl)hexafluoropropane, polysiloxanes hydroxyl-terminated at both termini, polyparavinylphenol, polyvinyl alcohol, .beta.-1,4-glucose, 2,2'-methylenebis(4-methyl-6-tert-butylphenol), 4,4'-thiobis(3-methyl-6-tert-butylphenol), poly(oxyethylene)alkylamines, poly(oxyethylene)alkylamides, sorbitan fatty acid esters, erysorbic acid, nordihydroguaiaretic acid, propyl gallate, riboflavin, pyridoxine, pantothenic acid, ascorbic acid, glycerophosphate, gluconic acid, gluconodeltalactone, erythritol, xylitol, xylose, sorbitol, inosine and arabinosylcytosine; polythiol compounds such as trimethylolpropane tris(thioglycolate), triglycol dimercaptan, pentaerythritol tetrakisthioglycolate, pentaerythritol tetrakisthiopropionate, trimethylolpropane tris(.beta.-thiopropionate) and 2,5-dimercapto-1,3,4-thiadiazole; polybasic carboxylic acid compounds such as adipic acid, azobiscyanovaleric acid, itaconic acid, imidiacetic acid, ethylenediaminetetraacetic acid, glutaric acid, succinic acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, trans-1,2-cyclohexanediaminetetraacetic acid, brasilic acid, hexahydrophthalic acid, polyacrylic acid, poly(4-hydroxybutyl acrylate), poly(2-hydroxyethyl acrylate), poly(2-hydroxypropyl acrylate), poly(2-hydroxyethyl methacrylate), poly(2-hydroxypropyl methacrylate), malonic acid, isophthalic acid, terephthalic acid, 1,4-naphthalenedicarboxylic acid, 2,6-naphthalenedicarboxylic acid, 5-hydroxyisophthalic acid, trimellitic acid, pyromellitic acid, phthalic acid, 1-cyanoethyl-2-methylimidazole trimellitate, 1-cyanoethyl-2-phenylimidazole trimellitate, 1-cyanoethyl-2-ethyl-4-methylimidazole trimellitate, imidazole-4,5-dicarboxylic acid, chelidamic acid, 2,3-pyrazinedicarboxylic acid, chlorendic acid, folic acid, aspartic acid, glutamic acid, citric acid, fumaric acid, malic acid and glycyrrhetic acid; polyamine compounds such as adipic dihydrazide, primary amine-modified acrylic polymers, 3,3'-iminobis(propylamine), 3-(methylamino)propylamine, N-methyl-3,3'-iminobis(propylamine), ethylenediamine, diethylenetriamine, triethylenetetramine, tetraethylenepentamine, pentaethylenehexamine, carbohydrazide, guanidine, guanylthiourea, 1,4-diaminobutane, diaminopropane, diaminomaleonitrile, dicyandiamide, 3,9-bis(3-aminopropyl)-2,4,8,10-tetraoxaspiro[5.5]undecane, thiocarbohydrazide, thiosemicarbazide, thiourea, dodecanedioicdihydrazide, hexamethylenediamine, formamidine, m-xylylenediamine, dianisidine, 4,4'-diaminostilbene-2,2'-disulfonic acid, 1,4-diamnoanthraquinone, 4,4'-diamino-3,3'-diethyldiphenylmethane, 4,4'-diaminobenzanilide, diaminodiphenyl ether, 3,3'-dimethyl-4,4'-diaminodiphenylmethane, tolidine base, m-toluylenediamine, phenylenediamine, amidol, paramine, acetoguanamine, 1-(2-aminoethyl)piperazine, 2,4-diamino-6-(2-methyl-1-imidazolyl)-ethyl-1,3,5-triazine, 1,3-bis(hydrazinocarboethyl)-5-isopropylhydantoin, piperazine, benzoguanamine, melamine, 3,3'-dichloro-4,4'- diaminodiphenylmethane, 3,3'-dichloro-4,4'-diaminobiphenyl, aminopolyacrylamide, polyallylamine and bisbentiamine; compounds having different kinds of active hydrogen, such as N-(2-aminoethyl)ethanolamine, N-methylethanolamine, 12-aminododecanoic acid, 3-amino-1-propanol, monoisopropanolamine, diisopropanolamine, monoethanolamine, diethanolamine, N-carboxy-4,4'-methylenebiscyclohexylamine, glyoxylic acid, glycylglycine, cysteamine, thioglycolic acid, 1-thioglycerol, lactic acid, .alpha.-hydroxyisobutyric acid, 2-hydroxyethylaminopropylamine, formamidoxime, 2-mercaptoethanol, .beta.-mercaptopropionic acid, p-aminobenzoic acid, 2-amino-4-chlorophenol, 2-aminothiophenol, aminophenol, anthranilic acid, .beta.-hydroxynaphthoic acid, salicylic acid, 2-amino-5-naphthol-7-sulfonic acid, thiosalicylic acid, p-hydroxybenzole acid, 6-hydroxy-2-naphthoic acid, p-hydroxyphenylacetic acid, p-hydroxyphenylacetamide, p-hydroxyphenylpropionic acid, benzilic acid, mandelic acid, leuco-1,4-diaminoanthraquinone, p-hydroxyphenylglycine, 3-carbamoylpyrazinecarboxylic acid, (hydroxyethyl)piperazine, 2-amino-4-chlorobenzoic acid, isoleucine, threonine, tryptophan, valine, histidine, phenylalanine, methionine, lysine, aspartame, alanine, glycine and theanine; water; ammonia; and so forth. These may be used singly or a plurality thereof may be used in combination.

Among these, hydroxyl-containing compounds and amino-containing compounds are preferred from the reactivity viewpoint and compounds having three or more hydroxyl groups or amino groups in each molecule, such as trimethylolpropane, trimethylolethane, pentaerythritol, 1,2,6-hexanetriol and melamine, are more preferred since product polymers showing increased strength can be obtained with them.

It is also possible to subject the excess isocyanato group to coupling by the isocyanurate ring formation reaction.

When, in the practice of the embodiments of the invention, the hydrosilylated polyoxyalkylene polymer is reacted with a coupling agent such as a compound having two or more isocyanato groups in each molecule, it is not always necessary to use a catalyst. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl 3-mercaptopropionate), dibutyltinbis(isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

In cases where the coupling reaction is carried out using a polybasic carboxylic acid, polybasic carboxylic acid anhydride, polybasic carboxylic acid derivative, aldehyde compound, carbonate compound or the like, too, those catalysts known in the art for the respective reactions can be used.

The addition amount of such a catalyst is not particularly restricted but preferably is 0.0001 to 3 parts by weight, more preferably 0.001 to 0.5 part by weight, most preferably 0.003 to 0.1 part by weight, per 100 parts by weight of the silylated polyoxyalkylene polymer. At an amount below 0.0001 part by weight, a sufficient reaction activity may not be obtained while, at an amount exceeding 3 parts by weight, the heat resistance, weathering resistance, hydrolysis resistance and/or like physical properties of the crosslinkable silyl group-containing polyoxyalkylene obtained may be impaired as the case may be.

While the use of a solvent is not necessary in the above coupling reaction, a solvent may be used for uniformly dissolving the catalyst and/or substrate, or for controlling the reaction system temperature or for facilitating the addition of the catalyst components. Solvents suited for such purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycol dimethyl ether, among others.

The methods of the embodiments of the invention do not require any treatment step or any purification step either before or after the hydrosilylation reaction or either before or after the coupling reaction which utilizes the hydroxyl group. The application of some or other treatment step or purification step for a particular reason is not excluded, however.

Since the production method of the invention does not require any purification step, the series of reaction steps from the polyoxyalkylene polymer production by polymerization to the coupling reaction can be carried out in succession in one and the same reactor.

The silylated polyoxyalkylene polymers obtained by the production method according to the embodiments of the invention can give crosslinked cured products upon reaction with water or the moisture in the atmosphere and are useful as raw materials or raw material intermediates for use in sealing compositions, adhesive compositions, coating compositions and the like for architectural or industrial use.

The embodiments of the invention, which have the constitution mentioned above, makes it possible to expediently obtain, from a polyoxyalkylene polymer having at least one unsaturated group and at least one alcoholic hydroxyl group in each molecule, a silylated polyoxyalkylene polymer having at least one crosslinkable silyl group and at least one hydroxyl group in each molecule or a crosslinkable silyl group-containing polyoxyalkylene polymer, without the necessity of removing the process-derived double metal cyanide complex catalyst or otherwise treat the double metal cyanide catalyst. As a result, the relevant purification or treating step can be omitted and the production process can be markedly simplified. The thus-obtainable silyleated polyoxyalkylene polymer shows a high crosslinkable silyl group introduction rate and a high remaining hydroxyl group percentage and therefore is suited for use in further functional group introduction or coupling utilizing the crosslinkable silyl group and/or hydroxyl group. The crosslinkable polyoxyalkylene polymer obtained provides satisfactory physical properties when used as a raw material in sealing compositions or adhesives compositions. In addition, the polymer can be stored stably for a long period. Furthermore, since any step of purifying or further treating the raw material is not necessary, the reactions from polymerization to coupling can be carried out continuously in a single reaction vessel.

EXAMPLES

The following examples are provided to illustrate the embodiments of the invention, but are not intended to limit the scope thereof. All parts and percentages are by weight unless otherwise indicated.

The following materials were used:

PGME A propylene glycol monoallyl ether. The PGME had an allylic content of 13.1% (0.998 mol of unsat/mol monol) and an OH number of 266.2 or 8.067% OH.

DMC catalyst A zinc hexacyanocobaltate based catalyst prepared as described in U.S. Pat. No. 5,482,908. The complexing agent is a combination of tert-butanol and polypropyleneglycol Propylene oxide 99.9% purity, available from The Dow Chemical Company.

Karstedt's catalyst Platinum-divinyltetramethyldisiloxane and xylene as carrier solvent, the Pt loading in the catalyst is 2 wt %. available from Gelest, Inc.

Methyldiethoxysilane Available from Gelest, Inc.

Methyldimethoxysilane Available from Gelest, Inc.

ISONATE* 50-OP A 50 percent 4,4'-methylene diphenyl isocyanate, 50 percent 2,4'-methylene diphenyl isocyanate mixture having a functionality of 2.0 and an equivalent weight of 125 g/equivalent available from The Dow Chemical Company.

PAPI* 27 A polymeric MDI (polymethylene polyphenylisocyanate) available from The Dow Chemical Company having a functionality of approximately 2.7, an iscyante equivalent weight or approximately 134 and an NCO content by weight of about 31.4%.

DABCO T-12 A tin catalyst available from Air Products.

Anhydrous $ZnCl_2$ powder Available from Alfa Aesar.

*ISONATE and PAPI are trademarks of The Dow Chemical Company.

Test Methods

Tensile strength was measured according to ASTM standard test D1708. Elongation at break was measured according to ASTM standard test D1708. 100% Secant Modulus was measured according to ASTM standard test D1708.

Alkoxylation of Propylene Glycol Monoallyl Ether

DMC catalyst (0.3207 g) was added to PGME (235.68 g). The mixture was dispersed for one minute with an Ultra Turrax high speed mixer, then charged into a previously nitrogen purged 9 L pressure reactor. The reactor contents were heated with agitation at 135° C., then propylene oxide monomer (5390 g) was metered at 5-7 gram/min into the reactor at 135° C. After propylene oxide feed was complete, the reactor was agitated at reaction temperature for an additional 1 hr to digest unreacted oxide. Approximately 1 kg of the alkoxylated propylene glycol monoallyl ether (APGME-1) was dispensed from the pressure reactor and saved for later use. APGME-1 has a number average molecular weight of about 5000.

The remaining content of the reactor contents (4688 g) was further reacted with a second feed of propylene oxide (455 g) at 135° C., followed by a digest to consume unreacted propylene oxide. Approximately 1 kg of the further alkoxylated propylene glycol monoallyl ether (APGME-2) was dispensed from the pressure reactor and saved for later use. APGME-2 has a number average molecular weight of 5500.

The remaining content of the reactor (4256 g) was then further reacted with a third feed of propylene oxide (385 g) at 135° C., followed by a digest to consume unreacted propylene oxide. The further alkoxylated propylene glycol monoallyl ether (APGME-3) was dispensed from the reactor. The final DMC concentration in APGME-3 was experimentally determined to be 41 ppm according to Atomic Absorption spectroscopy. APGME-3 has a number average molecular weight of about 6000.

Another batch of polyalkylene oxide alkoxylated propylene glycol monoallyl ether (APGME-4) was synthesized following the same preparation method described above for APGME-1. DMC catalyst (0.875 g) was added to PGME (1003.62 g). The mixture was dispersed for one minute with an Ultra Turrax high speed mixer, then charged into a previously nitrogen purged 9 L pressure reactor. The reactor contents were heated with agitation at 135 C, then propylene oxide monomer (1060 g) was metered at 5-7 gram/min into the reactor at 135° C. After propylene oxide feed was complete, the reactor was agitated at reaction temperature for an additional 1 hr to digest unreacted oxide. DMC concentration in APGME-4 was experimentally determined to be 281 ppm. 6000 OH Hydrosilylation of Alkoxylated Propylene Glycol Monoallyl Ethers

Example 1

APGME-3 (102.28 g) was charged into a 250-ml glass reactor equipped with continuous nitrogen purge, a heating mantle and a thermocouple. The reactor was then warmed to 68° C., and Karstedt's catalyst (0.112 g) was added. Methyldiethoxysilane (2.15 g) was added and the hydrosilylation reaction was allowed to take place at 70-75° C. for 15 min. $^1$H-NMR results showed a hydrosilylation efficiency of 80.2%. Hydrosilylation efficiency was calculated by integrating the $^1$H-NMR peaks corresponding to reacted and unreacted methyl group that is covalently bonded to a Si atom.

Example 2

APGME-3 (58.63 g) was charged into a 250 ml glass reactor equipped with continuous nitrogen purge, a heating mantle and a thermocouple. The reactor was heated to 50° C. and the reactor temperature was carefully controlled. Methyldimethoxysilane (0.96 g) and Karstedt's catalyst (0.06 g) were subsequently added. Reaction conversion was followed using $^1$H-NMR over a period of 30 minutes. The conversion at 15 minutes was 95.4%.

Examples 3-15

Alkoxylated propylene glycol monoallyl ether (100 g) was charged into a 250 mL glass reactor equipped with continuous nitrogen purge, a heating mantle and a thermocouple. The alkoxylated propylene glycol monoallyl ether used is given in Table 1. The reactor was heated to the temperature specified in Table 1. The hydrosilylation reaction is initiated by injecting methyldimethoxysilane (1.8 g) and calculated amount of Karstedt's catalyst, see Table 1 for details. The reaction was allowed to proceed for 1 hr. The reaction mixture was analyzed using $^1$H NMR.

TABLE 1

| Example | Alkoxylated Propylene glycol monoallyl ether | APGME DMC catalyst content (ppm) | Temperature (°C.) | Karstedt's catalyst (ppm) | Hydrosilylation ratio (%) |
|---|---|---|---|---|---|
| 3 | APGME-3 | 41 | 50 | 550 | 90 |
| 4 | APGME-4 | 281 | 50 | 550 | 86 |
| 5 | APGME-3/APGME-4, in a weight ratio of 5.9/4.1 | 140 | 50 | 550 | 93 |
| 6 | APGME-3/APGME-4, in a weight ratio of 5.9/4.1 | 140 | 50 | 100 | 82 |
| 7 | APGME-3/APGME-4, in a weight ratio of 5.9/4.1 | 140 | 50 | 1000 | 75 |
| 8 | APGME-3 | 41 | 25 | 1000 | 75 |
| 9 | APGME-3 | 41 | 25 | 100 | 40 |
| 10 | APGME-4 | 281 | 25 | 1000 | 63 |
| 11 | APGME-3/APGME-4, in a weight ratio of 5.9/4.1 | 140 | 80 | 550 | 81 |
| 12 | APGME-4 | 281 | 80 | 100 | 76 |
| 13 | APGME-3 | 41 | 80 | 100 | 83 |
| 14 | APGME-3 | 41 | 80 | 1000 | 76 |
| 15 | APGME-4 | 281 | 80 | 1000 | 72 |

As seen in Table 1, allyl monol containing 41, 140 and 281 ppm DMC catalyst resulted in similar hydrosilylation conversions. Thus, hydrosilylation of a terminally unsaturated polyalkylene oxide polymer is not dependent upon DMC concentration.

Isocyanate Reaction of Hydrosilylated Alkoxylated Propylene Glycol Monoallyl Ethers Example 16

ISONATE 50-OP (1.08 g) was added to the reactor containing the hydrosilylated product of Example 2 along with DABCO T-12 catalyst (0.05 g) to carry out the coupling reaction: the reaction of hydroxyl with isocyanate. The reactor was heated to 60° C. for 1 hour and complete conversion of isocyanate was confirmed by FTIR. The final product was cured at ambient conditions for 10 days. Physical properties were measured on samples having a width of 0.187 inches, a length of 1.500 inches, and a thickness of 0.014 inches. The tensile strength was 35.5 psi, the elongation at break was 679.7%, and the 100% Secant Modulus was 4.278 psi.

Example 17

PAPI (0.78 g) was added to a reactor containing the hydrosilylated product of Example 1 (53.8 g) along with DABCO T-12 catalyst (0.02 g) to carry out the coupling reaction. The reactor was heated to 60° C. for 1 hour and complete conversion of isocyanate was confirmed by FTIR. The final product was cured at ambient conditions for 10 days. Physical properties were measured on samples having a width of 0.187 inches, a length of 1.500 inches, and a thickness of 0.014 inches. The tensile strength was 55.2 psi, the elongation at break was 368%, and the 100% Secant Modulus was 22 psi.

While the foregoing is directed to embodiments of the present invention, other and further embodiments of the invention may be devised without departing from the basic scope thereof, and the scope thereof is determined by the claims that follow.

The invention claimed is:

1. A method of producing a hydrosilylated polyoxyalkylene polymer having at least one crosslinkable silyl group and at least one hydroxyl group in each molecule, the method comprising:
   providing a polyoxyalkylene polymer having at least one unsaturated group and at least one alcoholic hydroxyl group in each molecule, wherein:
      the polyoxyalkylene polymer includes an impurity double metal cyanide complex mixed therein, and the polyoxyalkylene polymer has not been treated with a metal-coordinating compound and has not been purified to significantly remove the impurity double metal cyanide complex, the impurity double metal cyanide complex including an organic complexing agent; and
   adding to the polyoxyalkylene polymer a compound having a hydrogen-silicon bond and a crosslinkable silyl group in each molecule so as to provide hydrosilylation reactants and a hydrosilylation catalyst to thereby carry out a hydrosilylation reaction, wherein:
      the hydrosilyation reaction is performed in an absence of a metal-coordinating compound and without removing or treating the double metal cyanide complex present in the hydrosilylation reactants, and the hydrosilyation reaction has a hydrosilylation efficiency of at least about 70% as determined by $^1$H-NMR.

2. The method of claim 1, wherein the double metal cyanide complex is a zinc hexacyanocobaltate-containing complex and is present in an amount between about 10 ppm and about 1000 ppm based on the weight the polyoxyalkylene polymer.

3. The method of claim 2, wherein the organic complexing agent is at least one of ethanol, isopropanol, n-butanol, isobutanol, 2-butanol, tert-butanol, and trimethylolpropane.

4. The method of claim 3 wherein the organic complexing agent comprises tert-butanol.

5. The method of claim 4, wherein the organic complexing agent further comprises polypropylene glycol.

6. The method of claim 3, wherein the hydrosilylation catalyst is a platinum-containing complex.

7. The method of any one of claim 6, wherein the hydrosilylation yield is not less than 70% on the unsaturated group basis and the remaining hydroxyl group percentage after the hydrosilylation reaction is not less than 80% as compared with the hydroxyl group content before the hydrosilylation reaction.

8. The method of claim 2, wherein a hydrosilylated polyoxyalkylene polymer having at least one crosslinkable silyl group and at least one hydroxyl group in each molecule is formed after the hydrosilyation reaction and the coupling reaction is carried out with the hydrosilylated polyoxyalkylene polymer and a compound having at least two isocyanato groups in each molecule.

9. A method of producing a crosslinkable silyl group-containing hydrosilylated polyoxyalkylene polymer, the method comprising:
(a) providing a polyoxyalkylene polymer having at least one unsaturated group and at least one alcoholic hydroxyl group in each molecule, wherein:
the polyoxyalkylene polymer includes an impurity double metal cyanide complex mixed therein, and the polyoxyalkylene polymer has not been treated with a metal-coordinating compound and has not been purified to significantly remove the impurity double metal cyanide complex, the impurity double metal cyanide complex including an organic complexing agent,
then adding to the polyoxyalkylene polymer a compound having a hydrogen-silicon bond and a crosslinkable silyl group in each molecule so as to provide hydrosilylation reactants and a hydrosilylation catalyst to thereby carry out a hydrosilylation reaction, wherein:
the hydrosilyation reaction is performed in an absence of a metal-coordinating compound and without removing or treating the double metal cyanide complex present in the hydrosilylation reactants, and the hydrosilyation reaction has a hydrosilylation efficiency of at least about 70% as determined by $^1$H-NMR; and
(b) carrying out a coupling reaction in which the hydroxyl group occurring in the polymer is involved.

10. The method of claim 9, wherein the coupling reaction is carried out at a temperature not lower than 50° C.

11. The method of claim 1, wherein the polyoxyalkylene polymer having at least one unsaturated group and at least one alcoholic hydroxyl group in each molecule has a number average molecular weight of not less than 3,000.

12. The method of claim 9, wherein the coupling reaction is carried out using a tin catalyst as a catalyst.

13. The method of claim 8, wherein the coupling reaction is effected, after reacting the hydrosilylated polyoxyalkylene polymer having at least one crosslinkable silyl group and at least one hydroxyl group in each molecule with the compound having at least two isocyanato groups in each molecule in a relative amount ratio such that the isocyanato group is in excess relative to the hydroxyl group.

14. The method of claim 9, wherein the double metal cyanide complex is a zinc hexacyanocobaltate-containing complex and is present in an amount between about 10 ppm and about 1000 ppm based on the weight the polyoxyalkylene polymer.

15. The method of claim 14, wherein the organic complexing agent is at least one of ethanol, isopropanol, n-butanol, isobutanol, 2-butanol, tert-butanol, and trimethylolpropane.

16. The method of claim 15 wherein the organic complexing agent comprises tert-butanol.

17. The method of claim 16, wherein the organic complexing agent further comprises polypropylene glycol.

18. The method of claim 15, wherein the hydrosilylation catalyst is a platinum-containing complex.

19. The method of claim 18, wherein the hydrosilylation yield is not less than 70% on the unsaturated group basis and the remaining hydroxyl group percentage after the hydrosilylation reaction is not less than 80% as compared with the hydroxyl group content before the hydrosilylation reaction.

20. The method of claim 19, wherein the polyoxyalkylene polymer having at least one unsaturated group and at least one alcoholic hydroxyl group in each molecule has a number average molecular weight of not less than 3,000.

* * * * *